(12) United States Patent
Naibo et al.

(10) Patent No.: US 7,668,860 B2
(45) Date of Patent: Feb. 23, 2010

(54) APPARATUS AND METHOD FOR CONSTRUCTING AND USING A SEMANTIC ABSTRACTION FOR QUERYING HIERARCHICAL DATA

(75) Inventors: Alexis-Jean Laurent Naibo, Levallois Perret (FR); Marcel Hassenforder, Boulogne Billancourt (FR)

(73) Assignee: Business Objects Software Ltd., Dublin (IE)

( * ) Notice: Subject to any disclaimer, the term of this patent is extended or adjusted under 35 U.S.C. 154(b) by 318 days.

(21) Appl. No.: 11/695,526

(22) Filed: Apr. 2, 2007

(65) Prior Publication Data

US 2008/0243767 A1 Oct. 2, 2008

(51) Int. Cl.
*G06F 17/30* (2006.01)
(52) U.S. Cl. .......................... 707/102; 707/6
(58) Field of Classification Search ............... 707/102, 707/5, 6, 10; 705/7; 715/744
See application file for complete search history.

(56) References Cited

U.S. PATENT DOCUMENTS

| | | | |
|---|---|---|---|
| 6,581,062 B1 | 6/2003 | Draper et al. | |
| 7,096,224 B2 * | 8/2006 | Murthy et al. | 707/100 |
| 7,096,229 B2 * | 8/2006 | Dettinger et al. | 707/102 |
| 7,403,937 B2 * | 7/2008 | Dettinger et al. | 707/2 |
| 7,461,052 B2 * | 12/2008 | Dettinger et al. | 707/3 |
| 7,467,157 B1 * | 12/2008 | Chen et al. | 707/102 |
| 2004/0181544 A1 * | 9/2004 | Anderson | 707/102 |
| 2004/0205585 A1 * | 10/2004 | McConnell | 715/513 |
| 2005/0044098 A1 * | 2/2005 | Dettinger et al. | 707/102 |
| 2005/0055369 A1 * | 3/2005 | Gorelik et al. | 707/102 |
| 2006/0031246 A1 * | 2/2006 | Grayson | 707/102 |
| 2006/0064428 A1 | 3/2006 | Colaco et al. | |
| 2006/0136469 A1 * | 6/2006 | Dettinger et al. | 707/102 |
| 2007/0156748 A1 * | 7/2007 | Emam et al. | 707/102 |
| 2007/0174322 A1 * | 7/2007 | Simison et al. | 707/102 |
| 2007/0266041 A1 * | 11/2007 | Beckman et al. | 707/102 |
| 2008/0162530 A1 * | 7/2008 | van Eikeren et al. | 707/102 |
| 2008/0195646 A1 * | 8/2008 | Meijer et al. | 707/102 |
| 2008/0228800 A1 * | 9/2008 | Dettinger et al. | 707/102 |

FOREIGN PATENT DOCUMENTS

JP 2002244894 A * 8/2002

OTHER PUBLICATIONS

HyoungDo Kim; An XML-based modeling language for the open interchange of decision models, Jan. 2001; Decision Support Systems vol. 31; pp. 429-441; retrieved from Google schoolar.*

* cited by examiner

*Primary Examiner*—Shahid A Alam
(74) *Attorney, Agent, or Firm*—Cooley Godward Kronish LLP

(57) ABSTRACT

A computer readable storage medium includes executable instructions to receive hierarchical data. A schema for the hierarchical data is also received. An entity relationship model for the hierarchical data is generated. A semantic abstraction associated with the entity relationship model is defined. An abstract term representing an underlying data element within the hierarchical data represented by the semantic abstraction is also defined.

30 Claims, 9 Drawing Sheets

APPARATUS AND METHOD FOR CONSTRUCTING AND USING A SEMANTIC ABSTRACTION FOR QUERYING HIERARCHICAL DATA

BRIEF DESCRIPTION OF THE INVENTION

This invention relates generally to semantic abstractions for accessing data. More particularly, this invention relates to defining and using a semantic abstraction to access hierarchical data.

BACKGROUND OF THE INVENTION

Business Intelligence generally refers to software tools used to improve business enterprise decision-making. These tools are commonly applied to financial, human resource, marketing, sales, customer, and supplier analyses. More specifically, these tools can include: reporting and analysis tools to present information; content delivery infrastructure systems for delivery and management of reports and analytics; and data warehousing systems for cleansing and consolidating information from disparate sources.

In many organizations it is desirable not to require the user of Business Intelligence to understand the complexities of the underlying data source. Within an organization, a range of underlying data sources, such as relational databases, On Line Analytic Processing (OLAP) systems, eXtensible Markup Language (XML) files, Really Simple Syndication (RSS) feeds, and other data sources are used to collect, store, and manage raw data. Therefore, it is advantageous to be able to work with data using a semantic abstraction that provides terms and abstracted logic for dimensions and measures on top of the underlying data. Semantic abstractions for relational databases are known in the art. Semantic abstraction techniques are disclosed in U.S. Pat. No. 5,555,403, the contents of which are incorporated herein by reference. It would be advantageous to enhance known semantic abstractions based on relational data sources and OLAP data sources, such that these semantic layers support hierarchical data in the form of file data such as XML and as streaming data, such as a web service or RSS feed.

Semantic abstractions assist users in creating meaningful queries against the underlying data sources and creating accurate reports without understanding the structure of the underlying data. It would useful to provide semantic abstractions based on hierarchical data.

SUMMARY OF INVENTION

The invention includes a computer readable storage medium with executable instructions to receive hierarchical data. A schema for the hierarchical data is also received. An entity relationship model for the hierarchical data is generated. A semantic abstraction associated with the entity relationship model is defined. An abstract term representing an underlying data element within the hierarchical data represented by the semantic abstraction is also defined.

The invention also includes a computer readable storage medium with executable instructions to receive a query specification and a semantic abstraction associated with the query specification. An execution plan is computed to include data source entities to be retrieved, relationships between the data source entities, grouped data source entities based on compatibility of data source entities, and process operation instructions. The execution plan is executed by retrieving a data flow from a data source driver and assembling the data flows into a result set. The result set is then provided.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
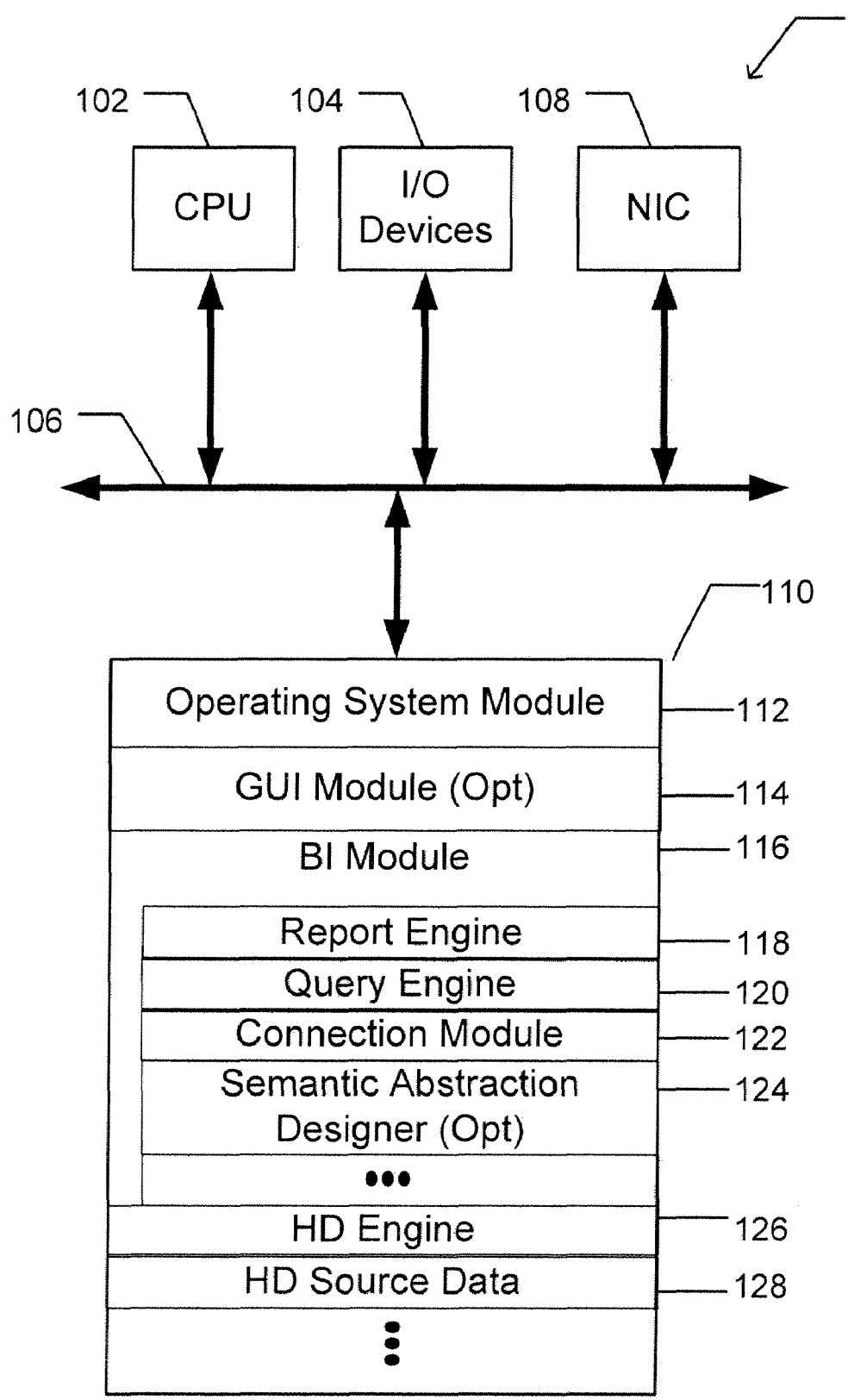
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 provides connectivity to a network (not shown), thereby allowing the computer 100 to operate in a networked environment.

A memory 110 is also connected to the bus 106. In an embodiment, the memory 110 stores one or more of the following modules: an operating system module 112, a graphical user interface (GUI) module 114, a business intelligence (BI) module 116, Report Engine 118, and Query Engine 120.

The operating system module 112 may include instructions for handling various system services, such as file services or for performing hardware dependant tasks. The GUI module 114 may rely upon standard techniques to produce graphical components of a user interface, e.g., windows, icons, buttons, menu and the like, examples of which are discussed below.

The BI module 116 includes executable instructions to perform BI related functions, such as, generate reports, perform queries and analyses, and the like. The BI module 116 can include the Report Engine 118, as a sub-module. The Report Engine 118 includes executable instructions for generating reports. The Query Engine module 120 includes executable instructions to analyze a received query, determine a plan for what aspects of the query should be evaluated by different modules or data sources, receive a result set, assemble data flows into a multidimensional result set, and perform post processing on the result set. The Connection Module 122 facilitates passing queries to different data sources or engines. For example, the Connection Module 122 can facilitate passing data from the BI module to a Hierarchical Data (HD) Engine 126 or directly to any other available data source (not shown). The optional Semantic Abstraction Designer 124 includes instructions to create and define a semantic abstraction and the business element terms within semantic abstractions such that they are associated with source data or source data structure. In one embodiment of the invention, the Semantic Abstraction Designer 124 works in conjunction with the GUI module 114 to provide graphical visualizations of the data structure or data structure elements and associated abstraction layer models or terms.

The HD Engine 126 includes instructions for accessing Hierarchical Data Source Data 128 and evaluating queries against this source data. In one embodiment, the engine includes instructions for processing multiple query flows. The Hierarchical Source Data 128 provides a data source as streaming data or a flat file. Data elements and data properties are read from the hierarchical source data.

Hierarchical Data (HD) is any set of data organized as a tree where parent child relationships exist between data elements, and where all possible parent child relationships can be expressed through a regular grammar.

A data element is an object in a data source. A data element comprises a set of one or more data properties. For example, a concept in an XML file or an entity in a relational database would be considered a data element. A data property is a characteristic or measure associated with a data element in a data source. For example, an attribute in an XML file or a relational database would be considered a data property.

A Hierarchical Data File (HDF) is hierarchical data materialized into a file. An XML file is a common implementation of hierarchical data stored in a text file rather than a database structure. Typically the text file is a flat file that contains data elements and data properties where relationships between data elements are indicated within the text using markup, tags, and the like. EXtensible Markup Language (XML) and other Standardized General Markup Languages (SGML) are common examples of hierarchical file data. XBRL (eXtensible Business Reporting Language) is a specialized XML standard.

A Hierarchical Data Stream is hierarchical data that is sequentially provided and consumed via a data stream. Dynamic data is a form of streaming data where data is streamed as further updates to the information become available. Static data is another form of streaming data where data is streamed based on a request for the data. A web service or RSS (Really Simple Syndication) feed are typical examples of Hierarchical Stream Data.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
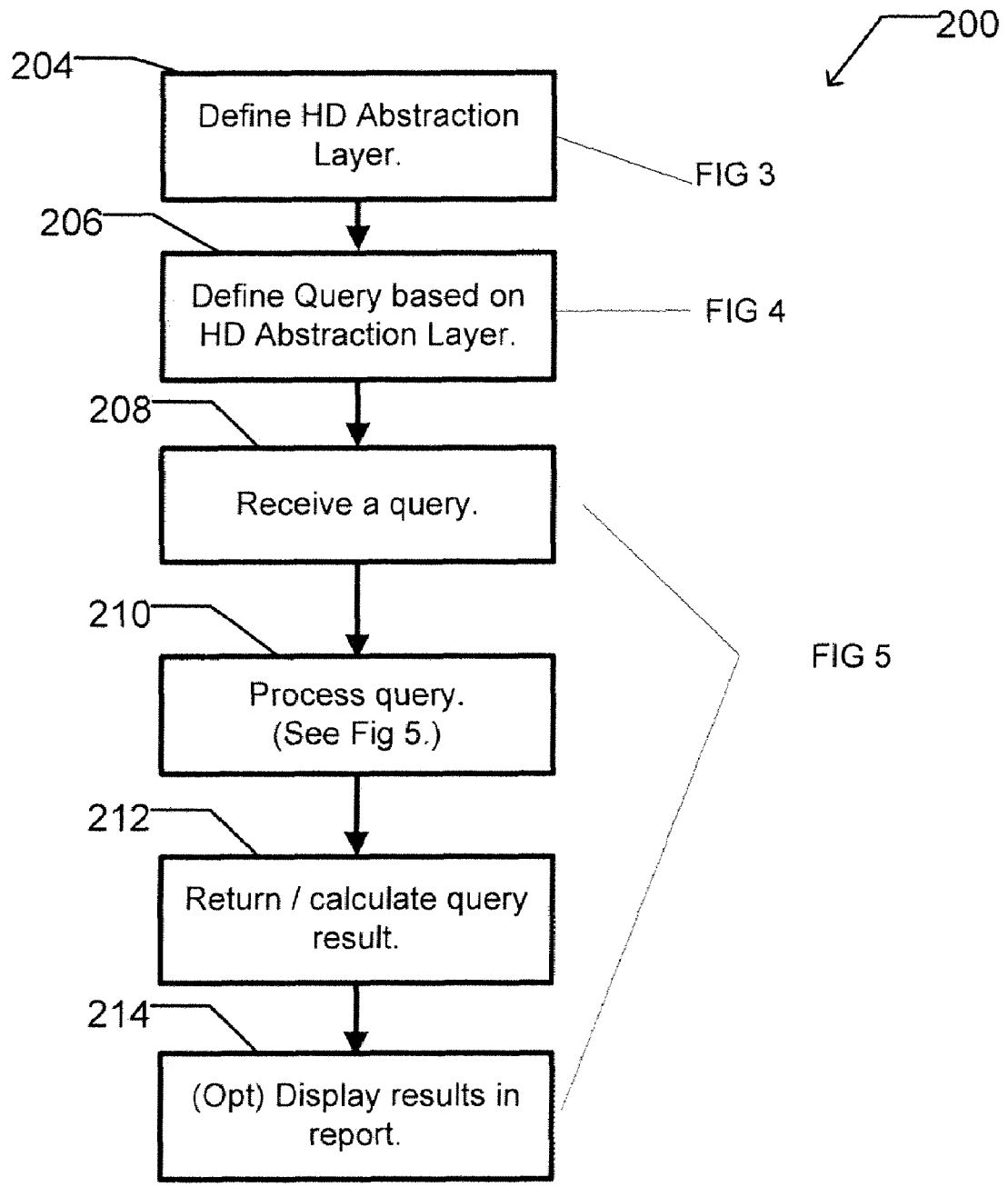
FIG. 2 illustrates a high level view of processing operations associated with an embodiment of the invention.

FIG. 2 illustrates a logical overview of operations 200 associated with an embodiment of the invention. Define a hierarchical data semantic abstraction 204 has a series of processing operations illustrated in more detail in FIG. 3. Define query based on hierarchical data abstraction layer 206 has a series of processing operations illustrated in more detail in FIG. 4. Operations 208-214 are illustrated in FIG. 5 and in more detail in FIG. 6-7. Receive a query 208 includes receiving a defined query based on a semantic abstraction for a hierarchical data source. Process query 210 includes computing a query execution plan and executing the query and is performed by the query engine 120 and hierarchical data engine 126. Return/calculate query result 212 includes returning a query result and performing any calculations required to produce the correct filtered, calculated, and sorted values, required to match the query specification. Optionally display results in a report 214 includes displaying the results of the query against a hierarchical data source based on a semantic abstraction within a report document, report dashboard, report analytic, and the like.

Figure 3:
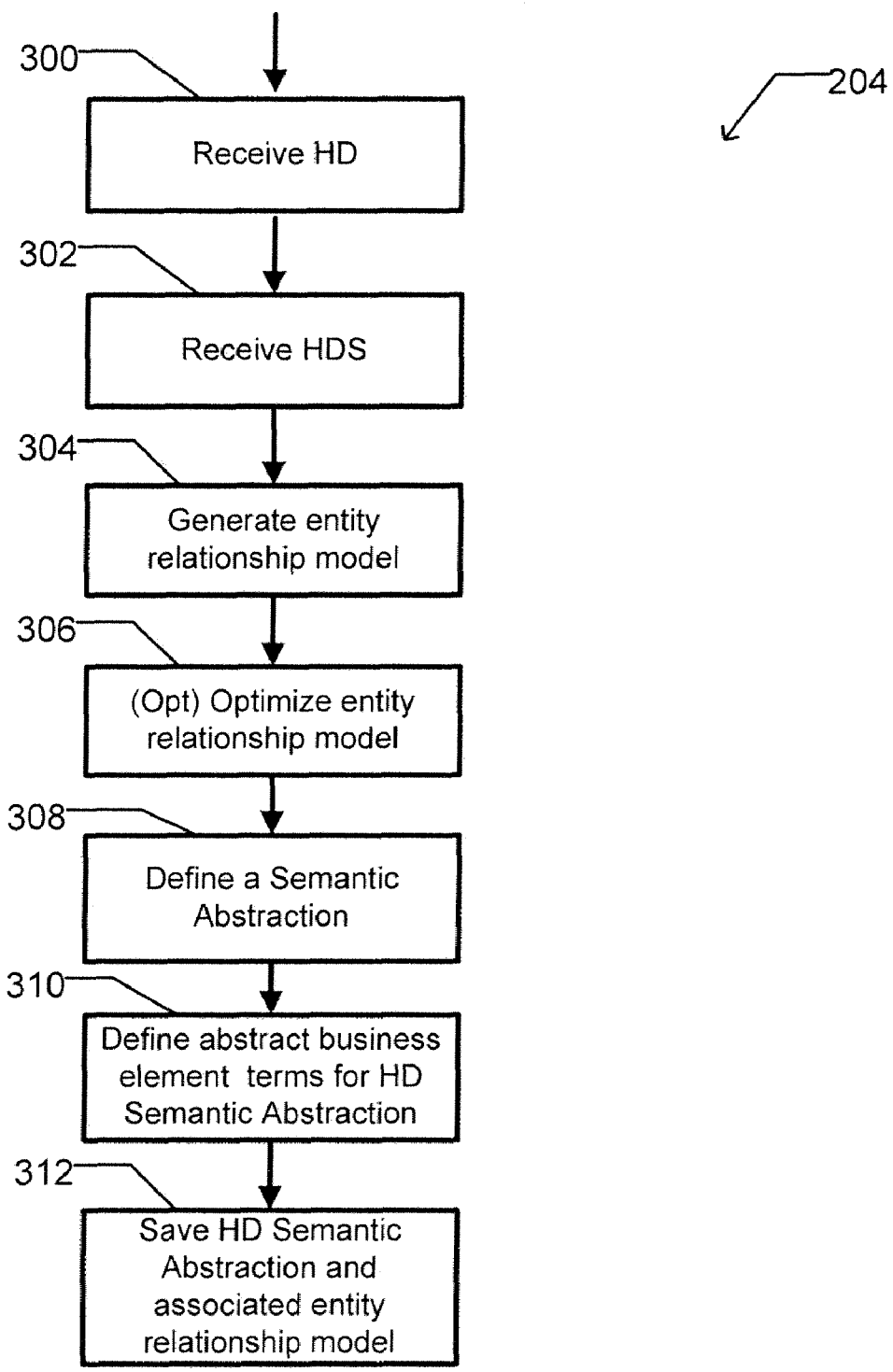
FIG. 3 illustrates processing operations for defining a Hierarchical Data (HD) semantic abstraction in accordance with an embodiment of the invention.

FIG. 3 illustrates a series of processing operations for defining a semantic abstraction based on a hierarchical data source 204 that may be implemented by the computer 100 of FIG. 1, and more specifically, by Semantic Abstraction Designer module 124. A semantic abstraction is the term for a level of abstraction based on an underlying data source. The semantic abstraction provides business element terms which are business language terms that represent the dimensions, attributes, measures, and other aspects of the underlying data source. Business elements may be user defined. These business elements are associated with the underlying data source members and model.

Receive Hierarchical Data (HD) 300 and receive Hierarchical Data Schema (HDS) 302 include receiving hierarchical data and a schema that describes the structure within the hierarchical data. A Hierarchical Data Schema (HDS) is a description of the relationship between data elements and data properties within hierarchical data. The schema defines a grammar for the hierarchical file data. An XML schema is a specific example of a hierarchical data grammar. Both hierarchical data files and hierarchical stream data depend on a schema to define the relationships and grammar. The received data and schema may take a number of forms, such as an XML file and Document Type Definition (DTD)/XML Schema Definition (XSD) file, a structured data file and a data template/specification, an RSS feed, a specification, and the like.

Generate entity relationship model 304 includes generating data element types, a logical structure of tables and joins that represents the schema and data content within the hierarchical data and hierarchical data schema. An Entity Relationship Model (ERM) is a data model that provides a high level description of a conceptual data model. An ERM typically describes relationships including relationships between elements, between elements and properties, between relationships and properties, and between properties and other properties. In one embodiment, these relationships within the model are joins and can be associated with a specific join type. Logical relationships including parent child, reference key, and recursive structures are represented in the entity relationship model.

Mapping a hierarchical data schema to an entity relationship model includes parsing the schema to determine inclusion (parent child) relationships in the schema as well as more complex relationships such as inheritance, recurrence, substitution and the like. For each schema element, a parent mapping, child mapping, relationship and relationship mapping is constructed. In one implementation, at least one path reference is built for each table and data entity. In the case of an XML based hierarchical data source, the path format might be an Xpath type reference. The path reference is stored with the entity relationship model. Join relationships include structure type joins that represents parent child relationships in the hierarchical data schema, self joins used to represent a recursive join structure in the hierarchical data structure, and inner joins used to model ID or other reference keys in the hierarchical data schema. Join relationships include cardinality such that hierarchical parent/child relationships are represented by left joins and the cardinality of other relationships indicated by the hierarchical date schema are represented. In addition to path links, the entity relationship model can also contain connection information and required parameters to access a hierarchical data source. For example, to connect to a web service based hierarchical data source, a connection string and required parameter values are specified. For example, this may include a user ID/Country, or other parameter value used to select the correct information stored within the entity relationship model. Optionally, optimize entity relationship model 306 performs optimization of the entity relationship model to simplify the logical table structure by merging tables that have structure type joins and can be logically combined.

Define a semantic abstraction 308 defines a semantic abstraction that is associated with the entity relationship model. The semantic abstraction can include a name, general connection information and logic, as well as abstract business element terms. Define abstract business element terms for hierarchical data semantic abstraction 310 includes enabling the user to define business element terms to describe data elements and combinations of data elements, and may include automatically generating familiar business element terms for common concepts such as data ranges, geographies, business periods, and the like. A business element term may be used to describe a combination of data elements (a dimension). For example a single business element term could be defined for "Customers" that aggregates values for data elements representing "resellers", "retail outlets", "clients", and "online accounts" and maintain the logic for the relationships that these data elements have with other data elements within the hierarchical data source. Business element terms can describe data elements or measures and calculations that can be applied to data elements using common business terminology rather than the language found in the underlying hierarchical data source. Business element terms are associated with at least one element of the hierarchical data and therefore are associated with at least one path. Business element terms define types (such as string, numeric, date) for the values associated with the business element term if they are dimensions and aggregation logic if they are measures or calculations. Save hierarchical data semantic abstraction and associated entity relationship model 312 includes saving the semantic abstraction for future use in queries and building advanced semantic abstractions within the BI module 116.

The semantic abstractions include the entity relationship model, path references for the data elements within the entity relationship model, path references for defined business element terms, and other connection information, such as connection strings, required authentication, and initial parameters for accessing the data that is represented by the semantic abstraction. In one embodiment of the invention, the entity relationship model is stored within the semantic abstraction, and in another embodiment the entity relationship model is referenced by the semantic abstraction.

In one embodiment of the invention, a graphical user interface is provided to facilitate user definition of business element terms. In one embodiment of the invention, the graphical user interface that is provided corresponds to a graphical user interface to build semantic abstractions based on relational data sources and enables the creation of a semantic abstraction based on a hierarchical data source where the structural characteristics defined are synchronized with those elements defined for a semantic abstraction based on a relational data source.

Figure 4:
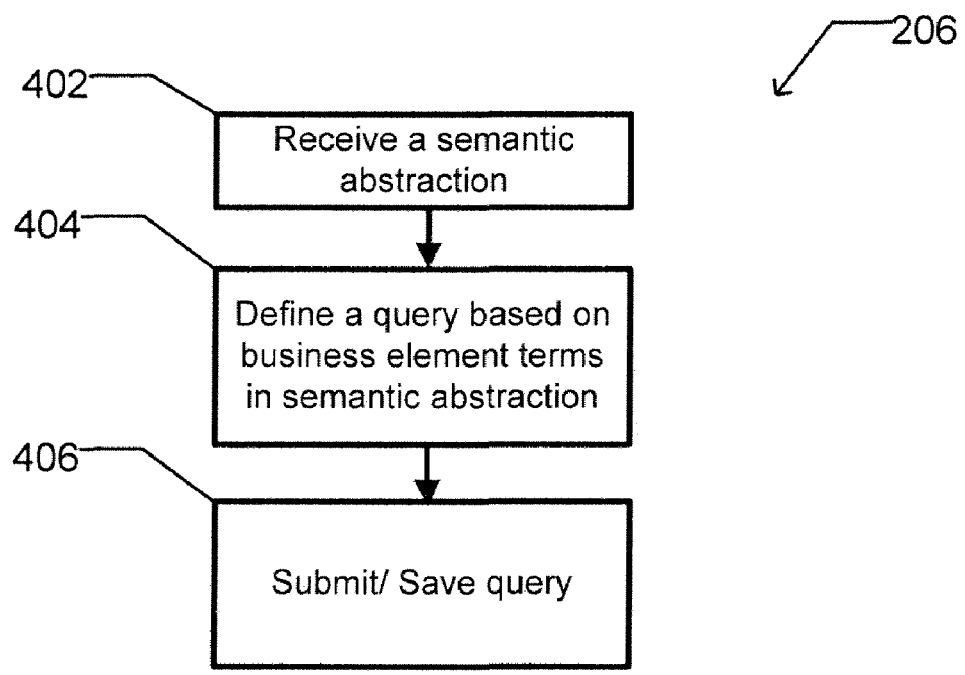
FIG. 4 illustrates processing operations for defining a query based on a Hierarchical Data (HD) semantic abstraction in accordance with an embodiment of the invention.
Figure 5:
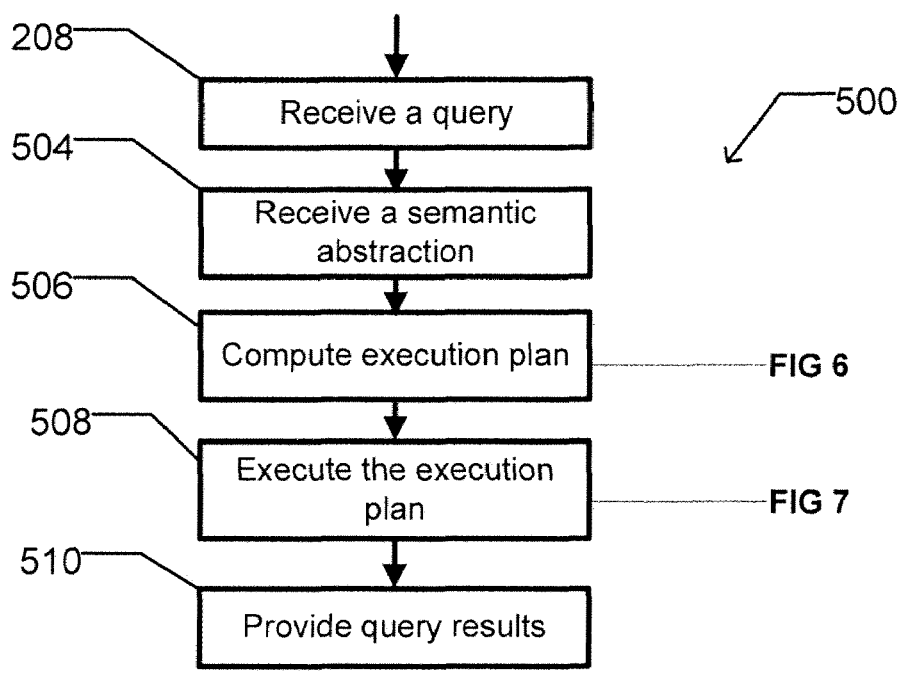
FIG. 5 illustrates a high level view of processing operations for retrieving and retuning query results based on a hierarchical data source query for a query based on a Hierarchical Data (HD) semantic abstraction in accordance with an embodiment of the invention.

FIG. 4 illustrates a series of processing operations for defining a query that may be implemented by the computer 100 of FIG. 1, and more specifically, by BI module 116. Receive a semantic abstraction 402 includes receiving one or more semantic abstractions. In the case of a query against a hierarchical data source, at least one semantic abstraction is based on a hierarchical data source. The semantic abstraction provides business element terms that describe desired data objects and combinations of data objects in the data source. Define a query based on business terms in semantic abstraction 404 includes specifying one or more business element terms to be retrieved in the result, defining the conditions that the result must match, and optionally the order or grouping in which the results will be sorted. The business terms in the query can define business elements either as specific data elements or groups of data elements or calculations/measures based on specific data elements or groups of data elements. Submit/save query 406 either submits the query to the Query engine 120 for evaluation or saves the query within the BI Module 116. In one embodiment of the invention, a graphical user interface (GUI) is provided to facilitate the process of creating a query for the user.

FIG. 5 illustrates a high level view of a series of processing operations associated with processing a query based on a semantic abstraction for a hierarchical data source 500 that may be implemented by computer 100 of FIG. 1, and more specifically by the Query Engine 120 and Hierarchical Data (HD) Engine 126. Receive a query 208 includes the Query Engine 120 receiving a query such as the query defined by process 206 in FIG. 4. Receive a semantic abstraction 504 includes receiving a semantic abstraction and an associated entity relationship model, such as the semantic abstraction defined by process 204 in FIG. 3. Compute execution plan 506 is a high level description of the processing operations performed by the query engine in the process of FIG. 6. Execute the execution plan 508 is a high level description of the operations performed by the hierarchical data engine and query engine in the process of FIG. 7. Provide query results 510 returns the query results, which may be subsequently displayed within a report document.

Figure 6:
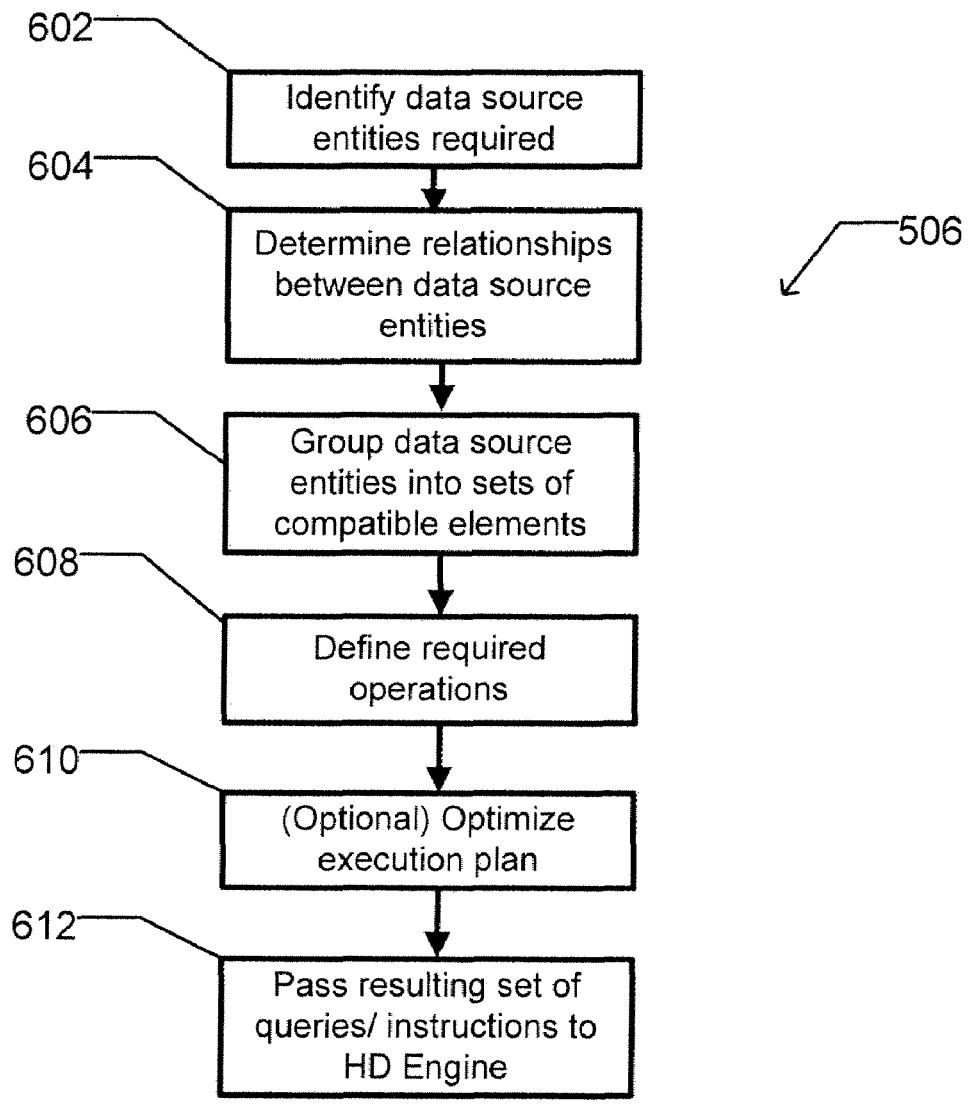
FIG. 6 illustrates processing operations for constructing a computation plan for a query based on a Hierarchical Data (HD) semantic abstraction in accordance with an embodiment of the invention.

FIG. 6 illustrates the more detailed processing operations 506 that may be implemented by the computer 100 of FIG. 1, and more specifically, by query engine module 120 in conjunction with the connection module 122. Process 506 illustrates the processing operations included in the Compute execution plan 506 step of the high level process illustrated in FIG. 5. Computing an execution plan includes generating one or more queries and instructions for interpreting the queries and assembling the query result. Process 506 includes computing a set of queries and any additional associated instructions. The process begins by evaluating a received query to identify the data source entities required 602. Determine relationships between data source entities 604 evaluates joins, common entity relationship table locations, and other aspects of the relationship between the data source entities. Group data source entities into sets of compatible elements 606 includes sorting the data entities based on their logical relationships, such that a set includes data source entities that are related so that they can be retrieved in a combined query. In one embodiment, when the query is complex, the query is divided such that each subquery constitutes entities located on the same path within the entity relationship schema that represents the data structure. If the query only requires data entities with a logical relationship, there may be only one query set produced. Define required operations 608 includes defining filters, calculations, and sorts that are required by the query specification. Required operations are defined on a number of levels, including within each set, between sets, and operations to be performed on the resulting data based on the capabilities of the HD engine. Optional, optimize execution plan 610 includes determining which processing can be pushed down to the hierarchical data engine and computational strategies, such as filtering and sorting the data that is retrieved. In one embodiment of the invention, these additional calculations are determined by the query engine based on the functional capacities of a specific hierarchical data engine that is associated with a type of hierarchical data. Pass the resulting set of queries/instructions to the hierarchical data engine 612 passes the query set and any associated instructions through the connection module 122 to the hierarchical data engine 126. In one embodiment, the query sets and instructions are translated to a different syntax or programming language to facilitate this transfer.

Figure 7:
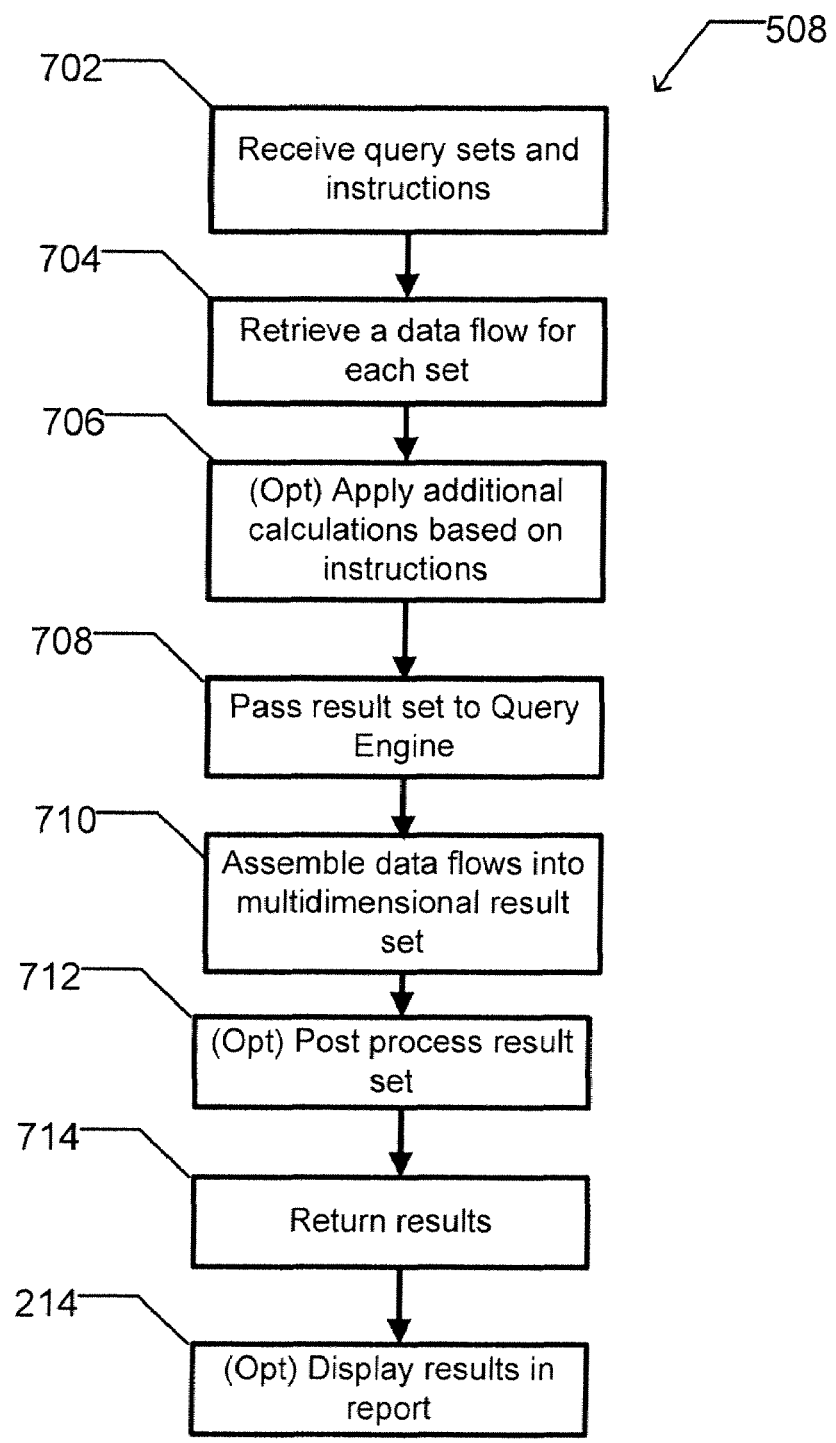
FIG. 7 illustrates processing operations for executing a computation plan for a query based on a Hierarchical Data (HD) semantic abstraction in accordance with an embodiment of the invention.

FIG. 7 illustrates processing operations 508 that may be implemented by the computer 100 of FIG. 1, and more specifically, by hierarchical data engine 126 in conjunction with the query engine module 120 and the connection module 122. Receive query sets and instructions 702 includes the hierarchical data engine receiving the query sets and constructing an internal query representation as required. Retrieve a data flow for each set 704 includes triggering data retrieval or a query of available data by the hierarchical data engine 126. In one embodiment of the invention, the HD engine internally reproduces the structure of the entity relationship tables and assembles result set rows into these tables and columns with attributes retrieved according to the path defined in the entity relationship model. In one embodiment of the invention, separate paths are used for table entities to determine the beginning and end of table rows and provide logic for when to insert new rows. In one embodiment of the invention, the HD engine assembles the flows from the table values retrieved, using the logic that when the highest level table of a driver query is completed the table values within the table tree are flushed inside the flows. Optionally apply additional calculations based on instructions 706 includes the hierarchical data engine performing calculations, filters, and the like that were pushed down to the hierarchical data engine 126 from the query engine 122.

Pass result set to query engine 708 includes passing the result set which may contain multiple flows through the connection module 122 to the query engine 120. Passing result sets to the query engine may occur with a partial result set that meets the criteria of the instructions (for example, results required to display a specific page in a report or to meet an initial request in a set of result requests) or with a complete set of results that fulfills all aspects of the query that has been passed to the HD engine. In one embodiment, the result set is translated to a different syntax or programming language to facilitate this transfer. In one embodiment of the invention, the query engine 120 that receives the result set has a distinct embodiment from the query engine 120 that passed the set of queries to the hierarchical data engine 126. Assemble data flows into a multidimensional result set 710 includes assembling queues of result rows into a multidimensional data cube. Synchronization, aggregation, and other logic may be applied to assemble the result rows into a multidimensional cube. The query engine 122 optionally performs post processing of the result set 712. The computation plan specifies the logic for assembling the query results into a multidimensional result set and performing any additional post-processing. The query engine 122 returns the results for the query 714 and optionally displays the results within a report 214. The result set need not be displayed in a report and can be provided to another process or component or as a web service. In one embodiment of the invention, a partial result set is displayed to meet the minimal requirements of the data required by the report or another component or process using the result set to more expediently make the data available.

Figure 8:
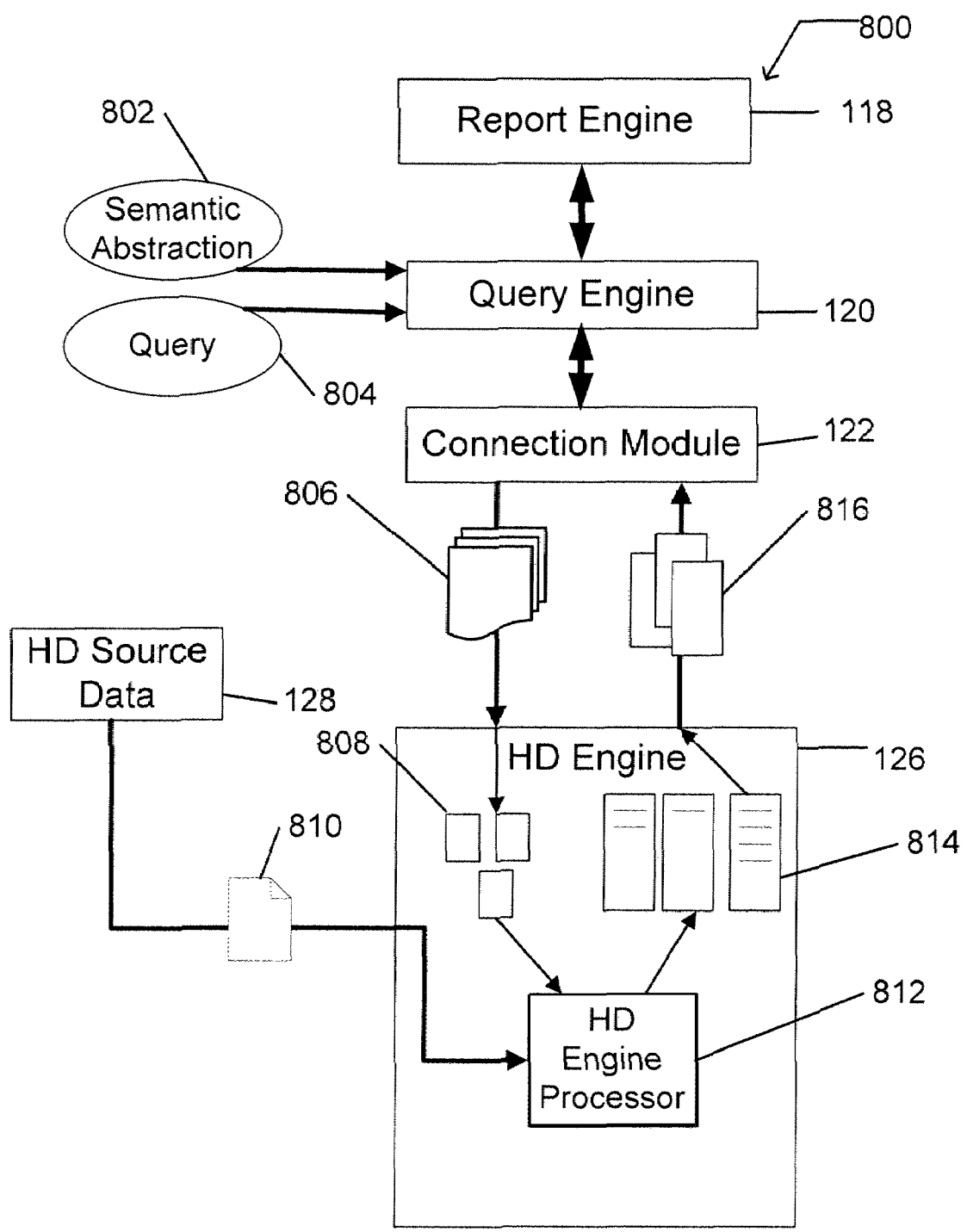
FIG. 8 illustrates the interaction between components when constructing and executing a computation plan for a query based on a Hierarchical Data (HD) semantic abstraction in accordance with an embodiment of the invention.

FIG. 8 illustrates the interaction between components when constructing and executing a computation plan for a query based on a Hierarchical Data (HD) semantic abstraction in accordance with an embodiment of the invention. The report engine 118 communicates with the query engine 120. The query engine 120 receives a semantic abstraction 802 and query 804 that defines the query results to return and is logically based on the semantic abstraction 802. The query engine 120 uses the semantic abstraction 802 and query 804 to construct the computation plan according to the processing operations illustrated in FIG. 6. The connection module 122 facilitates transferring the instructions and sets of queries that constitute the computation plan 806 to the HD Engine 126. The HD engine creates an internal query representation 808 which is passed to the HD engine processor 812. The HD engine processor 812 reads HD source data 128 and receives a flow of hierarchical data 810 based on the queries provided within the computational plan. The HD engine processor 812 constructs queues of result rows 814 that are then passed by the HD engine 126 to the connection module 122 in an appropriate multi flow result set format 816. The connection module facilitates transferring these results to the query engine 120. The query engine 120 processes the result set into a multidimensional result set and performs any required post-processing. The query engine can then pass the result set to the report engine for display within a report or to another component or process for use by another process.

Figure 9:
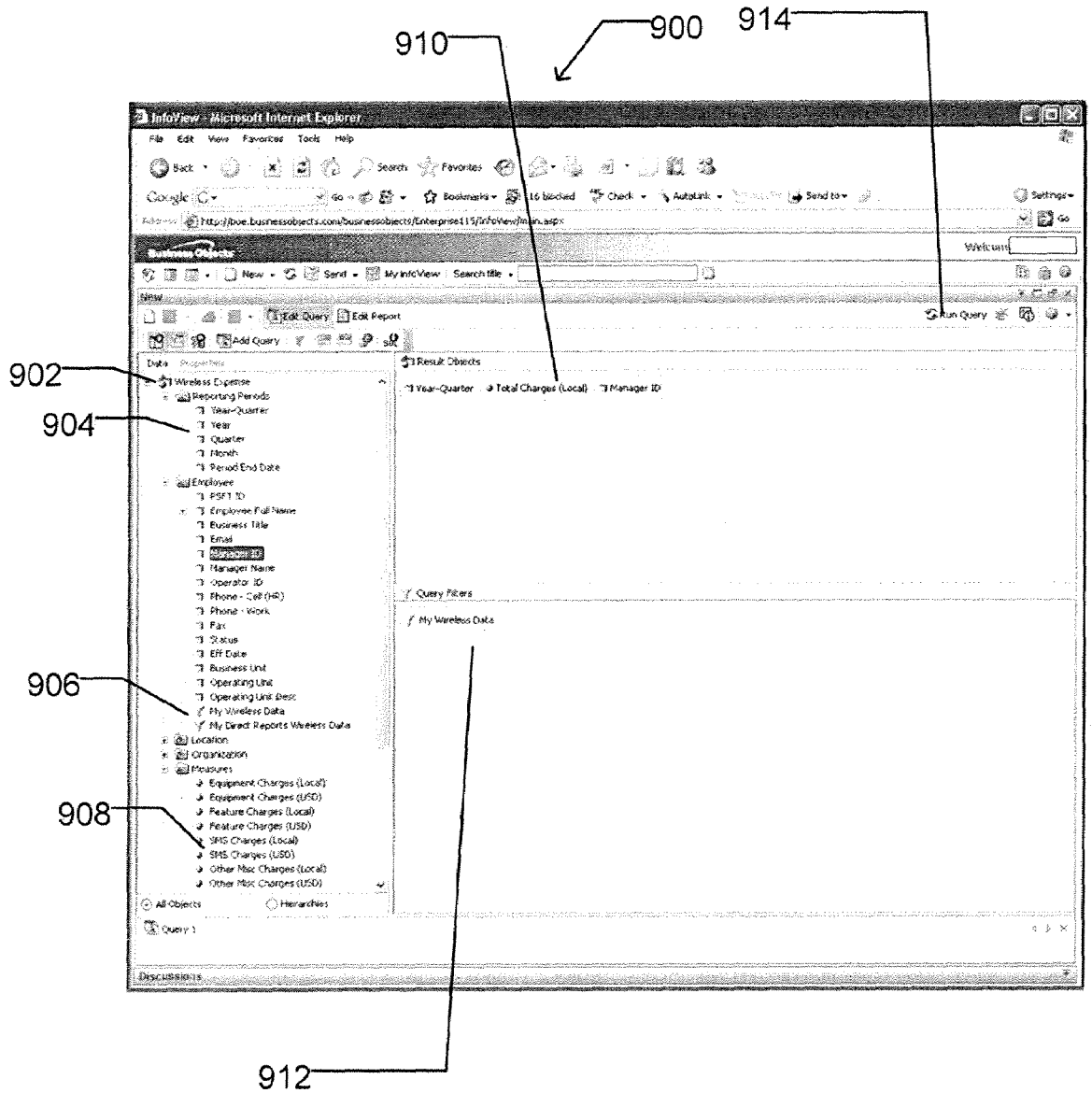
FIG. 9 illustrates a graphical user interface associated with an embodiment of the invention.

FIG. 9 illustrates a graphical user interface 900 associated with an embodiment of the invention. This graphical user interface enables users to build a query based on the defined business element terms and to generate a report based on the query. A semantic abstraction 902 is provided. In one embodiment of the invention, a semantic abstraction based on a hierarchical data source is defined such that the structural characteristics are synchronized with those contained in semantic abstractions that describe a relational data source. The semantic abstraction includes business element terms for dimensions, filters, and measures. In the graphical user interface, dimensions are indicated by cubes 904. Dimensions describe data elements and combinations of data elements using common business language rather than by describing the logic of the underlying data source. In the graphical user interface, filters are indicated by a funnel symbol 906. Filters are business element terms that describe a filter using common business language rather than by describing the logic of the underlying data source. In the graphical user interface, measures are indicated by a sphere 908. Measures are business element terms that describe a value, calculation, or calculated value using common business language rather than by describing the logic of the underlying data source. The user specifies business element terms to determine result objects using the result objects panel 910 and filter panel 912 and can run the query 914 to generate returned values or a report that matches the business element terms specified in the query. This graphical user interface provides potential interoperability between semantic abstractions defined based on different types of underlying data sources.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
    receive hierarchical data;
    receive a hierarchical data schema associated with the hierarchical data, wherein the hierarchical data schema defines relationships between data elements and data properties within the hierarchical data;
    generate an entity relationship model for the hierarchical data schema, wherein the entity relationship model represents the relationships in the hierarchical data schema as a logical structure of tables and joins;
    map the hierarchical data schema to the entity relationship model;
    define a semantic abstraction associated with the entity relationship model;
    define a business element term representing an underlying data element within the hierarchical data represented by the semantic abstraction, wherein the semantic abstraction includes the entity relationship model and the business element term; and
    create a report query based on the business element term.

2. The computer readable storage medium of claim 1 further comprising executable instructions to associate the entity relationship model with a set of specific data elements within the hierarchical data by storing a path reference to the data elements within the set of specific data elements.

3. The computer readable storage medium of claim 2 wherein the path reference is stored in a path format.

4. The computer readable storage medium of claim 2 further comprising executable instructions to associate the path reference with the business element term within the semantic abstraction.

5. The computer readable storage medium of claim 1 wherein the business element term representing the underlying data element aggregates multiple underlying data elements within the hierarchical data.

6. The computer readable storage medium of claim 5 wherein the business element term is a calculated value that is calculated based on applying logical calculations to one or more of the underlying data elements within the hierarchical data.

7. The computer readable storage medium of claim 1 wherein the hierarchical data is selected from eXtensible Markup Language (XML), Standard General Markup Language (SGML), eXtensible Business Reporting Language (XBRL), Really Simple Syndication (RSS), and web service data.

8. The computer readable storage medium of claim 1 wherein the schema for the hierarchical data is received as a separate file.

9. The computer readable storage medium of claim 1 further comprising executable instructions specifying the schema for the hierarchical data.

10. The computer readable storage medium of claim 1 wherein the entity relationship model stores connection information for accessing a hierarchical data source associated with the hierarchical data.

11. The computer readable storage medium of claim 10 wherein the connection information is selected from a connection string, a user ID, a user password, and a parameter value used to select the correct information.

12. The computer readable storage medium of claim 1 wherein the executable instructions to generate the entity relationship model comprises executable instructions to define join relationships to represent parent child relationships.

13. The computer readable storage medium of claim 1 wherein the executable instructions to generate the entity relationship model further comprise executable instructions to define join relationships to represent reference keys in the hierarchical data schema.

14. The computer readable storage medium of claim 1 wherein the executable instructions to generate the entity relationship model further comprise executable instructions to optimize the entity relationship model to simplify the logical table structure by merging tables.

15. The computer readable storage medium of claim 1 wherein the executable instructions to generate the entity relationship model comprise executable instructions to parse the schema for one or more relationships selected from parent child, inheritance, recurrence, and substitution.

16. The computer readable storage medium of claim 1 wherein the executable instructions to define the business element term representing the underlying data element within the hierarchical data represented by the semantic abstraction further comprise a graphical user interface to facilitate defining the business element term.

17. A computer readable storage medium, comprising executable instructions to:
- receive a query specification;
- receive a semantic abstraction associated with the query specification, wherein the semantic abstraction represents data source entities to be retrieved from an underlying data source;
- compute an execution plan, wherein the executable instructions to compute the execution plan comprise executable instructions to:
  - evaluate the query specification to identify one or more of the data source entities to be retrieved;
  - determine relationships between the data source entities;
  - group data source entities into sets of compatible data source entities based on logical relationships between the data source entities;
  - process operation instructions required by the query specification; and
- execute the execution plan, wherein the executable instructions to execute the execution plan comprise executable instructions to:
  - retrieve a data flow associated with the query specification from a data source driver; and
  - assemble the data flows into a query result set; and
- provide the query result set.

18. The computer readable storage medium of claim 17 wherein the semantic abstraction further comprises an entity relationship model definition.

19. The computer readable storage medium of claim 18 wherein the entity relationship model definition stores connection information for accessing a hierarchical data source associated with the hierarchical data.

20. The computer readable storage medium of claim 19 wherein the connection information is selected from a connection string, a user ID, a user password, and a parameter value used to select the correct information.

21. The computer readable storage medium of claim 17 wherein the executable instructions to define the process operation instructions further comprise executable instructions to define one of a synchronization, join, filtering, or aggregation logic.

22. The computer readable storage medium of 17 wherein the executable instructions to provide the result set further comprise executable instructions to return the results in a report format.

23. The computer readable storage medium of 17 wherein the executable instructions to compute an execution plan further comprise executable instructions to determine which operations can be pushed to a data source driver.

24. The computer readable storage medium of 17 wherein the executable instructions to compute an execution plan further comprise executable instructions to determine which operations will be processed after data is retrieved.

25. The computer readable storage medium of 17 wherein the executable instructions to compute an execution plan further comprise executable instructions to optimize the execution plan based on the capacities of data drivers and query engines.

26. The computer readable storage medium of 17 wherein the executable instruction to identify data source entities further comprise executable instructions to identify the location of the entity within the entity relationship model definition.

27. The computer readable storage medium of claim 26 further comprising executable instructions to use a path location to identify the location of the entity within the entity relationship model definition.

28. The computer readable storage medium of claim 27 wherein the executable instructions to group data source entities into sets include executable instructions to group entities into groups based on the path location of the entity within the entity relationship model definition.

29. The computer readable storage medium of claim 17 wherein the executable instructions to receive a semantic abstraction associated with the query further comprises executable instructions to parse the query to determine which semantic abstraction to retrieve and to retrieve the semantic abstraction.

30. The computer readable storage medium of claim 17 wherein the executable instructions to receive an entity relationship model associated with the query further comprise executable instructions to parse the query to determine which entity relationship model to retrieve and to retrieve the entity relationship model.

* * * * *